US012754134B2

(12) United States Patent
Miyato et al.

(10) Patent No.: US 12,754,134 B2
(45) Date of Patent: Oct. 6, 2026

(54) DETECTION DEVICE AND MEASUREMENT APPARATUS

(71) Applicant: FUJIFILM Corporation, Tokyo (JP)

(72) Inventors: Takahiro Miyato, Kanagawa (JP); Hitoshi Shimizu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 18/530,924

(22) Filed: Dec. 6, 2023

(65) Prior Publication Data

US 2024/0102928 A1 Mar. 28, 2024

Related U.S. Application Data

(63) Continuation of application No. PCT/JP2022/019852, filed on May 10, 2022.

(30) Foreign Application Priority Data

Jul. 29, 2021 (JP) ................................ 2021-124684

(51) Int. Cl.
*G01N 21/55* (2014.01)
*G01N 1/44* (2006.01)

(52) U.S. Cl.
CPC ............... *G01N 21/55* (2013.01); *G01N 1/44* (2013.01); *G01N 2021/551* (2013.01)

(58) Field of Classification Search
CPC .. G01N 1/44; G01N 2021/551; G01N 21/272; G01N 21/55; G01N 21/82; G01N 2201/0256; G01V 8/12
See application file for complete search history.

(56) References Cited

U.S. PATENT DOCUMENTS

2006/0263258 A1 11/2006 Harris et al.
2008/0180667 A1 7/2008 Okuno
(Continued)

FOREIGN PATENT DOCUMENTS

CN 209784385 U 12/2019
JP 60-118979 U 8/1985
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2022/019852, dated Feb. 8, 2024, with an English translation.
(Continued)

*Primary Examiner* — Jennifer Wecker
(74) *Attorney, Agent, or Firm* — Birch, Stewart, Kolasch & Birch, LLP

(57) ABSTRACT

A detection device including: a holding block that holds a transparent tubular body having a curved surface shape; an accommodating hole that is formed in the holding block and in which the tubular body is inserted and accommodated; an optical sensor that includes a light projecting unit which emits detection light for detecting whether or not the tubular body is accommodated in the accommodating hole and a light receiving unit which receives the detection light; and an optical path of the detection light that has a tunnel structure covered with a wall surface, the optical path linearly extending inside the holding block in a direction intersecting with the accommodating hole and being formed at a position away from a radial center of the accommodating hole, in which a wall surface of the accommodating hole and a wall surface of the optical path have a light reflectivity of 30% or less.

7 Claims, 14 Drawing Sheets

(56) References Cited

U.S. PATENT DOCUMENTS

| | | | |
|---|---|---|---|
| 2011/0143947 A1 | 6/2011 | Chamberlin et al. | |
| 2022/0236263 A1* | 7/2022 | Irisawa ................ | G01N 33/579 |

FOREIGN PATENT DOCUMENTS

| | | | |
|---|---|---|---|
| JP | 2000-275256 A | 10/2000 |
| JP | 2002-279870 A | 9/2002 |
| JP | 2007-263838 A | 10/2007 |
| JP | 2008-112629 A | 5/2008 |
| JP | 3172595 U | 1/2012 |
| JP | 2013-500496 A | 1/2013 |
| JP | 2017-58262 A | 3/2017 |
| WO | WO 2011/017094 A2 | 2/2011 |

OTHER PUBLICATIONS

International Search Report (Form PCT/ISA/210) for International Application No. PCT/JP2022/019852, dated Jul. 5, 2022, with an English translation.

Extended European Search Report for corresponding European Application No. 22848985.2, dated Nov. 5, 2024.

* cited by examiner

<COMPARATIVE EXAMPLE>

DETECTION DEVICE AND MEASUREMENT APPARATUS

CROSS-REFERENCE TO RELATED APPLICATIONS

This application is a continuation application of International Application No. PCT/JP2022/019852 filed on May 10, 2022, the disclosure of which is incorporated herein by reference in its entirety. Further, this application claims priority from Japanese Patent Application No. 2021-124684 filed on Jul. 29, 2021, the disclosure of which is incorporated herein by reference in its entirety.

BACKGROUND

1. Technical Field

The technology of the present disclosure relates to a detection device and a measurement apparatus.

2. Description of the Related Art

Various detection devices that detect a transparent tubular body having a curved surface shape, such as a cylindrical test tube, have been proposed. For example, JP3172595Y describes a detection device using a transmissive optical sensor that includes a light projecting unit that emits detection light, and a light receiving unit that is disposed at a position facing the light projecting unit and that receives the detection light.

In JP3172595Y, the light projecting unit and the light receiving unit are disposed at positions away from a radial center of the tubular body. In a case where there is no tubular body between the light projecting unit and the light receiving unit, most of the detection light reaches the light receiving unit. In a case where there is a tubular body between the light projecting unit and the light receiving unit, the detection light is reflected and refracted by the tubular body to change a traveling direction and hardly reaches the light receiving unit. Therefore, in a case where a detection signal at a set level is output from the light receiving unit, it can be determined that there is no tubular body between the light projecting unit and the light receiving unit, and in a case where the detection signal at the set level is not output from the light receiving unit, it can be determined that there is a tubular body between the light projecting unit and the light receiving unit.

SUMMARY

JP3172595Y has not considered measures against external light and/or stray light from detection light. Therefore, due to the influence of external light and/or stray light from detection light, it becomes difficult to distinguish between a level of the detection signal output from the light receiving unit in a case where there is no tubular body between the light projecting unit and the light receiving unit and a level of the detection signal output from the light receiving unit in a case where there is a tubular body between the light projecting unit and the light receiving unit, which may lead to a risk of erroneous determination.

One embodiment according to the technology of the present disclosure provides a detection device and a measurement apparatus that can reduce a risk of erroneous determination.

According to the present disclosure, there is provided a detection device comprising: a holding block that holds a transparent tubular body having a curved surface shape; an accommodating hole that is formed in the holding block and in which the tubular body is inserted and accommodated; an optical sensor that includes a light projecting unit which emits detection light for detecting whether or not the tubular body is accommodated in the accommodating hole and a light receiving unit which receives the detection light; and an optical path of the detection light that has a tunnel structure covered with a wall surface, the optical path linearly extending inside the holding block in a direction intersecting with the accommodating hole and being formed at a position away from a radial center of the accommodating hole, in which a wall surface of the accommodating hole and a wall surface of the optical path have a light reflectivity of 30% or less.

It is preferable that the optical sensor is a reflective optical sensor in which the light projecting unit and the light receiving unit are integrated and disposed at one end of the optical path, and a reflective member that reflects the detection light, which is emitted from the light projecting unit, toward the light receiving unit is disposed at the other end of the optical path.

It is preferable that the reflective member has a property of retroreflection.

It is preferable that the holding block is made of aluminum, and the wall surface of the accommodating hole and the wall surface of the optical path are subjected to a matte black alumite treatment.

It is preferable that a processor and a memory connected to or incorporated into the processor are further provided, in which the processor is configured to: determine that the tubular body is not accommodated in the accommodating hole in a case where a detection signal at a set level is output from the light receiving unit; and determine that the tubular body is accommodated in the accommodating hole in a case where the detection signal at the set level is not output from the light receiving unit.

According to the present disclosure, there is provided a measurement apparatus comprising: the detection device according to any one of the above installed thereon, in which the tubular body is a cylindrical test tube in which a sample solution formed by mixing a lysate reagent with a sample is stored, and presence or absence and/or an amount of a specific substance in the sample is measured.

It is preferable that a heater for warming the sample solution inside the test tube to a set temperature is attached to the holding block.

According to the technology of the present disclosure, it is possible to provide a detection device and a measurement apparatus that can reduce a risk of erroneous determination.

BRIEF DESCRIPTION OF THE DRAWINGS

Exemplary embodiments according to the technique of the present disclosure will be described in detail based on the following figures, wherein.

DETAILED DESCRIPTION

Figure 1:
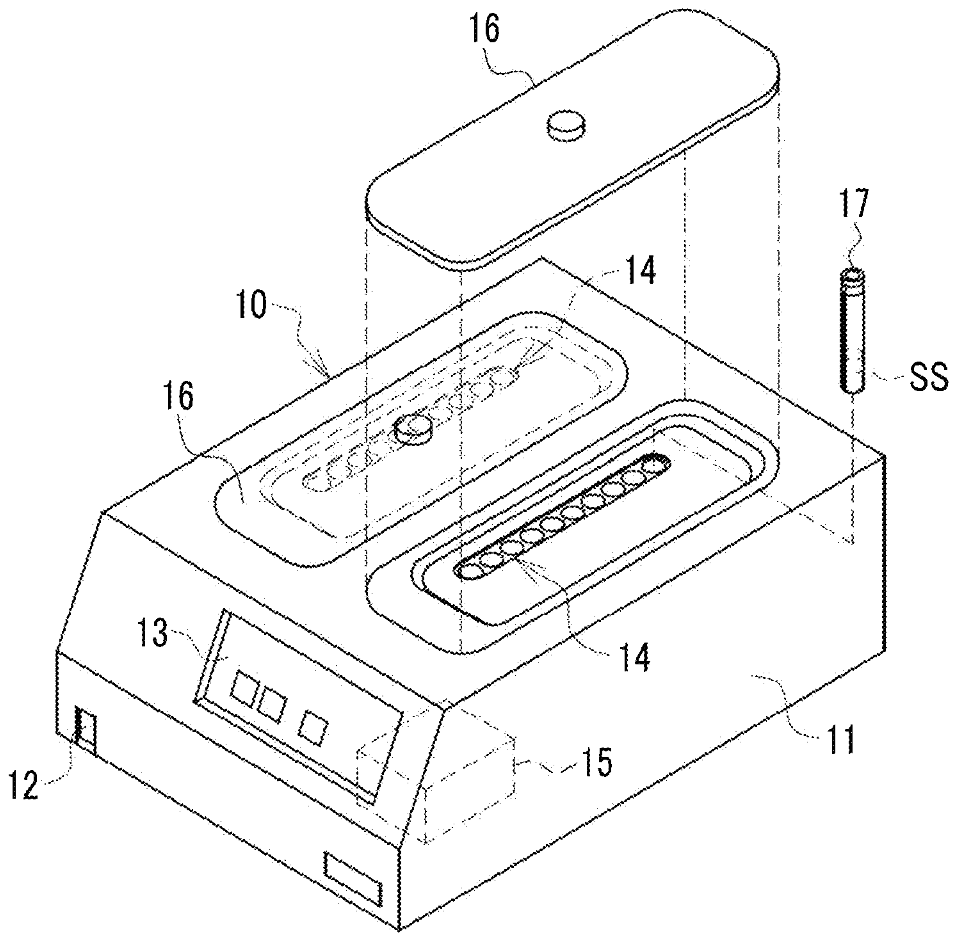
FIG. 1 is a perspective view showing a measurement apparatus.

As shown in FIG. 1 as an example, a measurement apparatus 10 of the present disclosure is an apparatus that measures an amount of endotoxin that may cause an immune reaction such as fever, and includes a substantially rectangular parallelepiped-shaped housing 11. A power switch 12 for turning on/off the power of the measurement apparatus 10 is provided at a lower part in a front surface of the housing 11, and an operation panel 13 for issuing various operation instructions is provided at an upper part in the front surface. In addition, two measurement units 14 that measure the amount of endotoxin are disposed side by side in a left-right direction on an upper surface of the housing 11. Further, a computer 15 that comprehensively controls the operation of each unit of the measurement apparatus 10 is incorporated into the housing 11. Endotoxin is an example of a "specific substance" according to the technology of the present disclosure.

A lid 16 is attachably and detachably attached to the measurement unit 14. The lid 16 covers an upper part of the measurement unit 14 when the measurement unit 14 is not in use and is removed from the upper part of the measurement unit 14 when the measurement unit 14 is in use.

A test tube 17 is set in the measurement unit 14. It is possible to set 10 test tubes 17 in one measurement unit 14. Therefore, the measurement apparatus 10 can measure the amount of endotoxin in a total of 20 test tubes 17 at once. The test tube 17 has a cylindrical shape and is made of a transparent material such as glass or transparent plastic. The test tube 17 is an example of a "tubular body" according to the technology of the present disclosure.

A sample solution SS formed by mixing a lysate reagent with a sample is stored in the test tube 17. The sample is a pharmaceutical product for which endotoxin-free is required, for example, an infusion solution or an injection solution that is administered to a patient in a medical field. The lysate reagent is, for example, a reagent for measuring endotoxin prepared from a blood cell extract (LAL; *Limulus* amebocyte lysate) of the American horseshoe crab (*Limulus Polyphemus*). The lysate reagent is also referred to as a *Limulus* reagent or a LAL reagent due to its origin. The sample may be blood or the like collected from the patient.

In a case where the sample contains endotoxin, the sample gels and becomes turbid due to the action of the lysate reagent. The measurement unit 14 measures the amount of endotoxin in the sample by measuring temporal changes in turbidity of the sample.

Figure 2:
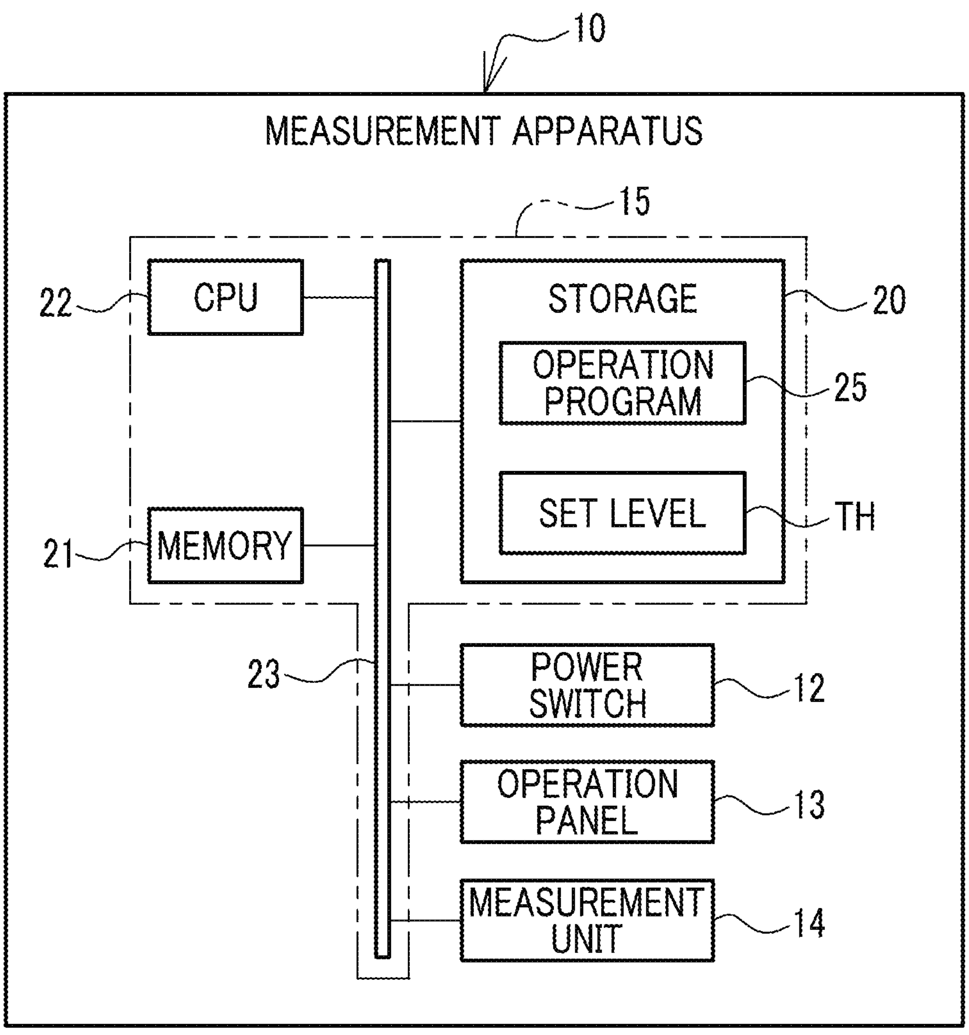
FIG. 2 is a block diagram showing an internal configuration of the measurement apparatus.

As shown in FIG. 2 as an example, the computer 15 is composed of a storage 20, a memory 21, a central processing unit (CPU) 22, and a bus line 23 that connects the storage 20, the memory 21, and the CPU 22 to each other. The power switch 12, the operation panel 13, and the measurement unit 14 described above are also connected to the bus line 23.

An operation program 25 is stored in the storage 20. The operation program 25 starts in conjunction with the power switch 12 being turned on and ends in conjunction with the power switch 12 being turned off. Further, a set level TH is stored in the storage 20.

The memory 21 is a work memory for the CPU 22 to execute processing. The CPU 22 loads the operation program 25 stored in the storage 20 into the memory 21 and executes processing corresponding to the operation program 25. As a result, the CPU 22 comprehensively controls the computer 15 and, consequently, an operation of each unit of the measurement apparatus 10. The CPU 22 is an example of a "processor" according to the technology of the present disclosure. The memory 21 may be incorporated into the CPU 22.

Figure 3:
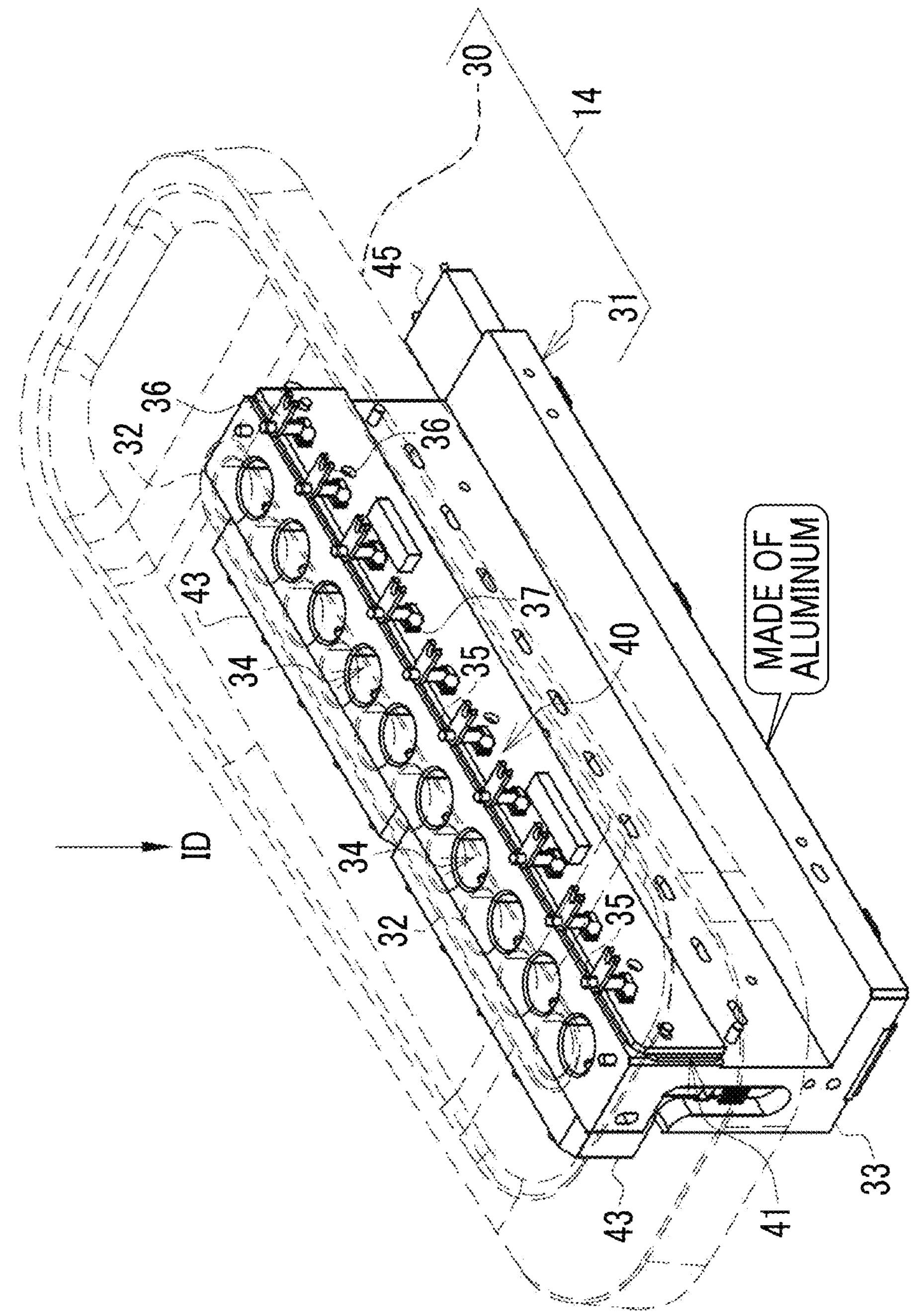
FIG. 3 is a perspective view showing a measurement unit.

As shown in FIG. 3 as an example, the measurement unit 14 is composed of a cover 30 and a measurement unit body 31. The cover 30 is a portion of the measurement unit 14 that is exposed on the upper surface of the housing 11 in a case where the lid 16 is removed, and covers an upper part of the measurement unit body 31. An insertion hole 32 is formed in the cover 30. The insertion hole 32 is a hole for inserting the test tube 17 into an accommodating hole 34 formed in a holding block 33 of the measurement unit body 31. The insertion holes 32 and the accommodating holes 34 are arranged at equal intervals along longitudinal directions of the cover 30 and the holding block 33 and are each disposed at the same positions.

In addition, a state display hole 35 is formed in the cover 30. The state display hole 35 is disposed next to the insertion hole 32. A distal end of a light guide 36 is visible through the state display hole 35. A proximal end of the light guide 36 is connected to a state display light emitting diode (LED) 37. The state display LED 37 emits light indicating a measurement state of the amount of endotoxin in each accommodating hole 34. The measurement state is, for example, the amount of endotoxin being measured, the measurement end, the measurement completion, the measurement preparation completion, the measurement error, and the like. The light indicating the measurement state is, for example, green light in a case of the amount of endotoxin being measured, blinking green light in a case of the measurement end, blue light in a case of the measurement preparation completion, red light in a case of the measurement error, and the like. The light guide 36 takes in light indicating the measurement state from the proximal end connected to the state display LED 37 and guides the light to the distal end visible through the state display hole 35. An arrow indicated by a reference numeral ID is an insertion direction of the test tube 17 into the accommodating hole 34.

Figure 4:
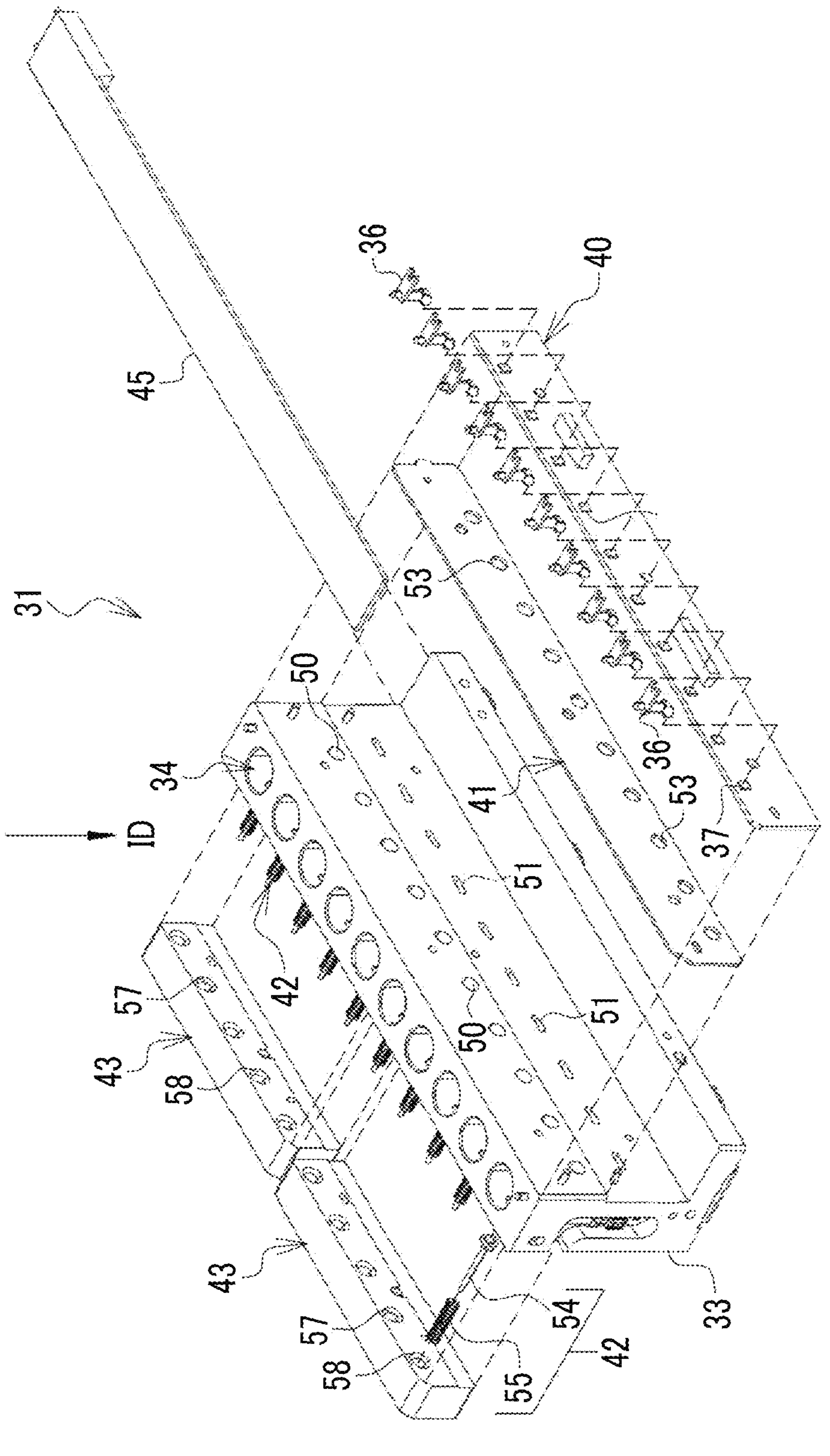
FIG. 4 is an exploded perspective view of a measurement unit body.
Figure 5:
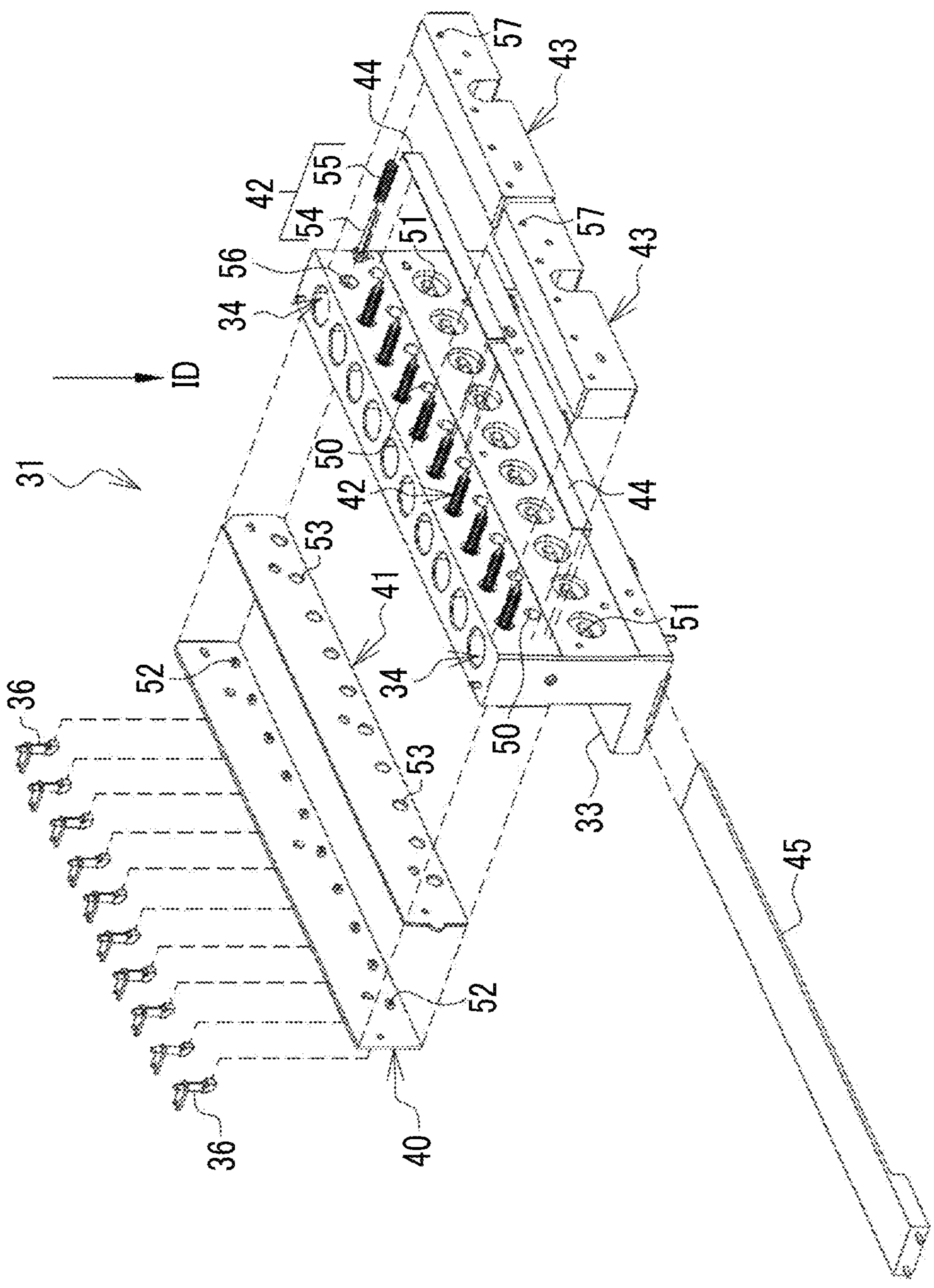
FIG. 5 is an exploded perspective view of the measurement unit body.

As shown in FIGS. 4 and 5 as an example, the measurement unit body 31 includes the holding block 33, the light guide 36, a circuit board 40, an insulating plate 41, a plunger 42, a plunger press 43, a reflective member 44, a rubber heater 45, and the like.

The holding block 33 is an L-like shaped metal block. The holding block 33 is made of, for example, aluminum (see FIG. 3). The accommodating hole 34 is formed in the holding block 33 as described above. The accommodating hole 34 extends linearly in an up-down direction. The test tube 17 is inserted into and accommodated in the accommodating hole 34, whereby the holding block 33 holds the test tube 17.

In addition, the same number of detection optical paths 50 as the accommodating holes 34 are formed in the holding block 33. The detection optical path 50 extends linearly in the left-right direction orthogonal to the up-down direction in which the accommodating hole 34 is formed. The detection optical path 50 penetrates the holding block 33 from one side surface to an opposite side surface. The detection optical path 50 is connected to the accommodating hole 34 at a central portion (see FIG. 9 and the like). The detection optical path 50 is an optical path of detection light DL (see FIG. 6 and the like) for detecting whether or not the test tube 17 is accommodated in the accommodating hole 34. That is, the detection optical path 50 is an example of an "optical path" according to the technology of the present disclosure. It should be noted that being "orthogonal" refers not only to being completely "orthogonal" but also to being "orthogonal" with a meaning including an error generally allowed in the technical field, to which the technology of the present disclosure belongs, and an error of a degree that does not depart from the gist of the technology of the present disclosure (for example, errors in a range of approximately 1% to 10%).

A measurement optical path 51 is formed below the detection optical path 50. The measurement optical path 51, like the detection optical path 50, also extends linearly in the left-right direction and penetrates the holding block 33 from one side surface to the opposite side surface. Moreover, the measurement optical path 51 is also connected to the accommodating hole 34 at a central portion. The measurement optical path 51 is an optical path of measurement light (not shown) for measuring the turbidity of the sample. A transmissive optical sensor (not shown) is disposed in the measurement optical path 51. More specifically, a light projecting unit of the transmissive optical sensor that irradiates the sample solution SS inside the test tube 17 with measurement light is disposed at one end of the measurement optical path 51, and a light receiving unit of the transmissive optical sensor that receives the measurement light is disposed at the other end of the measurement optical path 51.

The circuit board 40 is attached to the upper part of the side surface of the holding block 33 with the insulating plate 41 interposed therebetween. The above-described state display LED 37 is mounted on the circuit board 40. Further, a reflective optical sensor 52 is mounted on a surface of the circuit board 40 that is opposite to a surface on which the state display LED 37 is mounted and that faces the side surface of the holding block 33. The reflective optical sensor 52 is disposed at a position facing one end of the detection optical path 50 in a case where the circuit board 40 is attached to the holding block 33.

The insulating plate 41 ensures insulation between the holding block 33 and the circuit board 40. A sensor disposition hole 53 is formed at a position of the insulating plate 41 that faces the one end of the detection optical path 50 and the reflective optical sensor 52. The reflective optical sensor 52 is disposed to project from the sensor disposition hole 53 to the one end of the detection optical path 50.

The same number of plungers 42 as the accommodating holes 34 are prepared. The plunger 42 is composed of a pin 54 and a spring 55. One end of the pin 54 has a large diameter, and is inserted into an insertion hole 56 formed in the holding block 33 and protrudes from a wall surface 70 (see FIG. 9 and the like) of the accommodating hole 34. The other end of the pin 54 is inserted into an insertion hole 57 formed in the plunger press 43. One end of the spring 55 is in contact with one end of the plunger 42. The other end of the spring 55 is in contact with a recessed portion 58 of the insertion hole 57. The spring 55 applies a biasing force to the pin 54 to press the test tube 17 accommodated in the accommodating hole 34 against one side of the accommodating hole 34 (a side on which the circuit board 40 or the like is disposed). The test tube 17 is positioned inside the accommodating hole 34 due to the actions of the plunger 42 and the plunger press 43.

The reflective member 44 is sandwiched between the holding block 33 and the plunger press 43. The reflective member 44 is disposed at a position where the reflective member 44 covers the other end of the detection optical path 50. The reflective member 44 has a property of retroreflection (see FIG. 10). The reflective member 44 is, for example, a retroreflective sheet or a retroreflective tape manufactured by 3M Japan Ltd.

Figure 6:
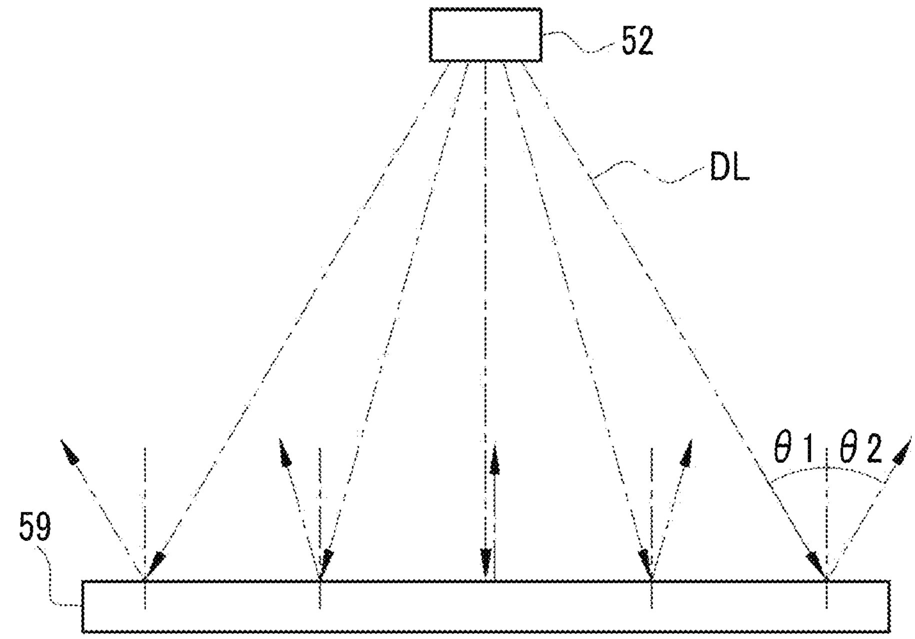
FIG. 6 is a diagram showing traveling of light in a case of a reflective member having no property of retroreflection.
Figure 7:
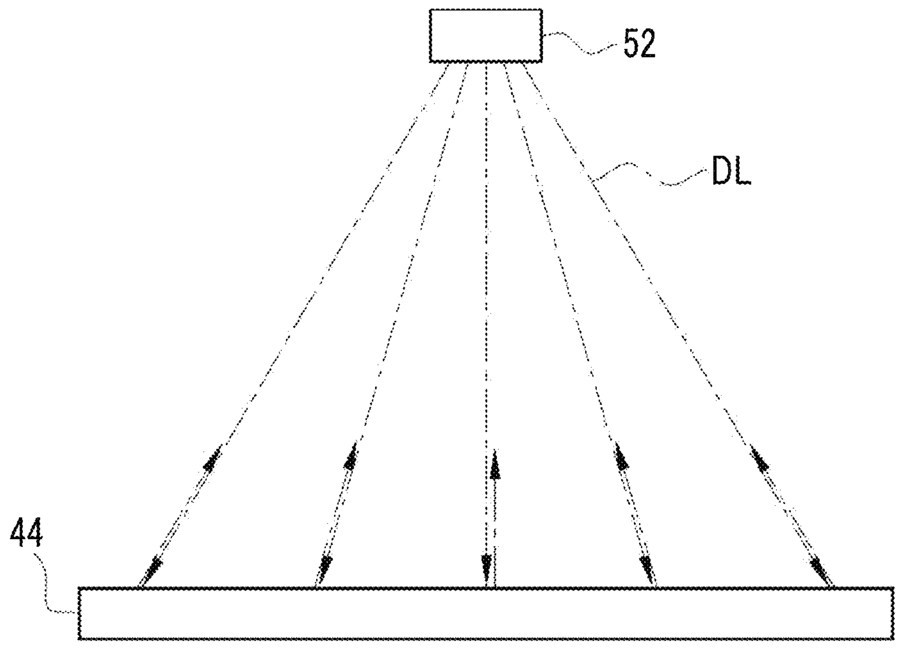
FIG. 7 is a diagram showing traveling of light in a case of a reflective member having a property of retroreflection.

As shown in FIG. 6 as an example, in a case of a reflective member having no property of retroreflection, for example, a planar mirror 59, the detection light DL from the reflective optical sensor 52 is specularly reflected on a surface of the planar mirror 59. More specifically, the detection light DL incident on the surface of the planar mirror 59 at an incidence angle $\theta 1$ is reflected only in a direction of a reflection angle $\theta 2$ symmetrical to the incidence angle $\theta 1$ with a normal line of the surface interposed therebetween. On the other hand, as shown in FIG. 7 as an example, in a case of the reflective member 44 having the property of retroreflection, almost all the detection light DL (for example, 90% to 99%) is reflected in a direction of the reflective optical sensor 52.

The rubber heater 45 is attached to a lower surface of the holding block 33. The rubber heater 45 warms the holding block 33 to a set temperature suitable for measuring the amount of endotoxin, for example, 37° C., under the control of the CPU 22.

Figure 8:
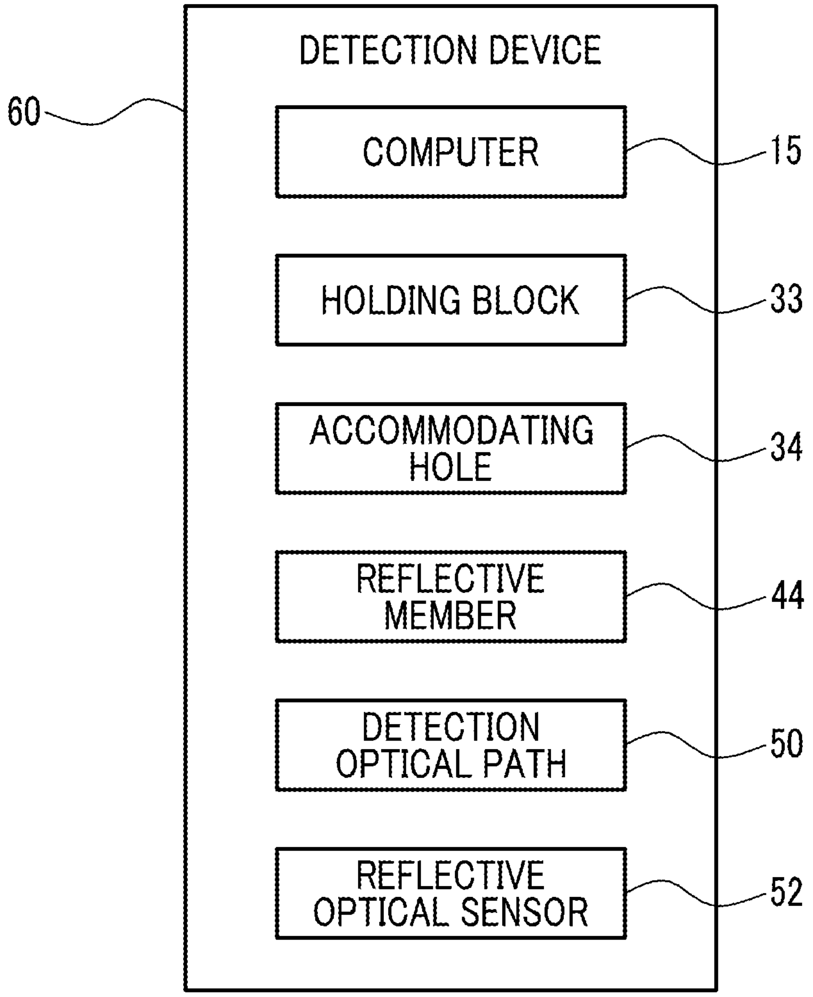
FIG. 8 is a diagram showing a detection device.

As shown in FIG. 8 as an example, the computer 15, the holding block 33, the accommodating hole 34, the reflective member 44, the detection optical path 50, and the reflective optical sensor 52 described above constitute a detection device 60 of the present disclosure.

Figure 9:
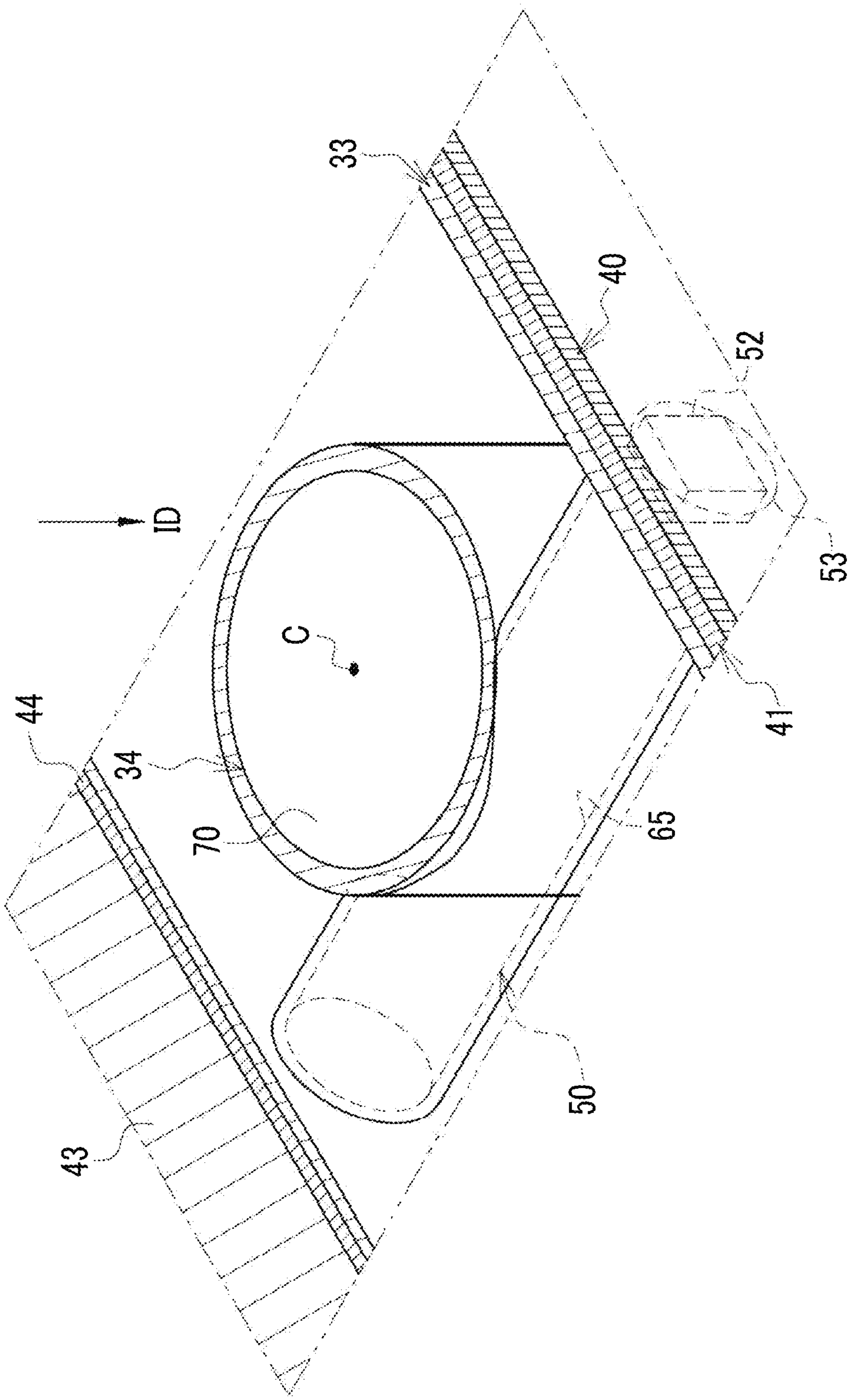
FIG. 9 is an enlarged cross-sectional view of an accommodating hole and a vicinity of a detection optical path.

As shown in FIG. 9 as an example, the detection optical path 50 has a tunnel structure covered with a wall surface 65. The detection optical path 50 is formed at a position away from a radial center C of the accommodating hole 34 (see also FIG. 10). The position away from the center C is a position where the center C is not present within the detection optical path 50, in other words, a position completely offset from the center C.

Figure 10:
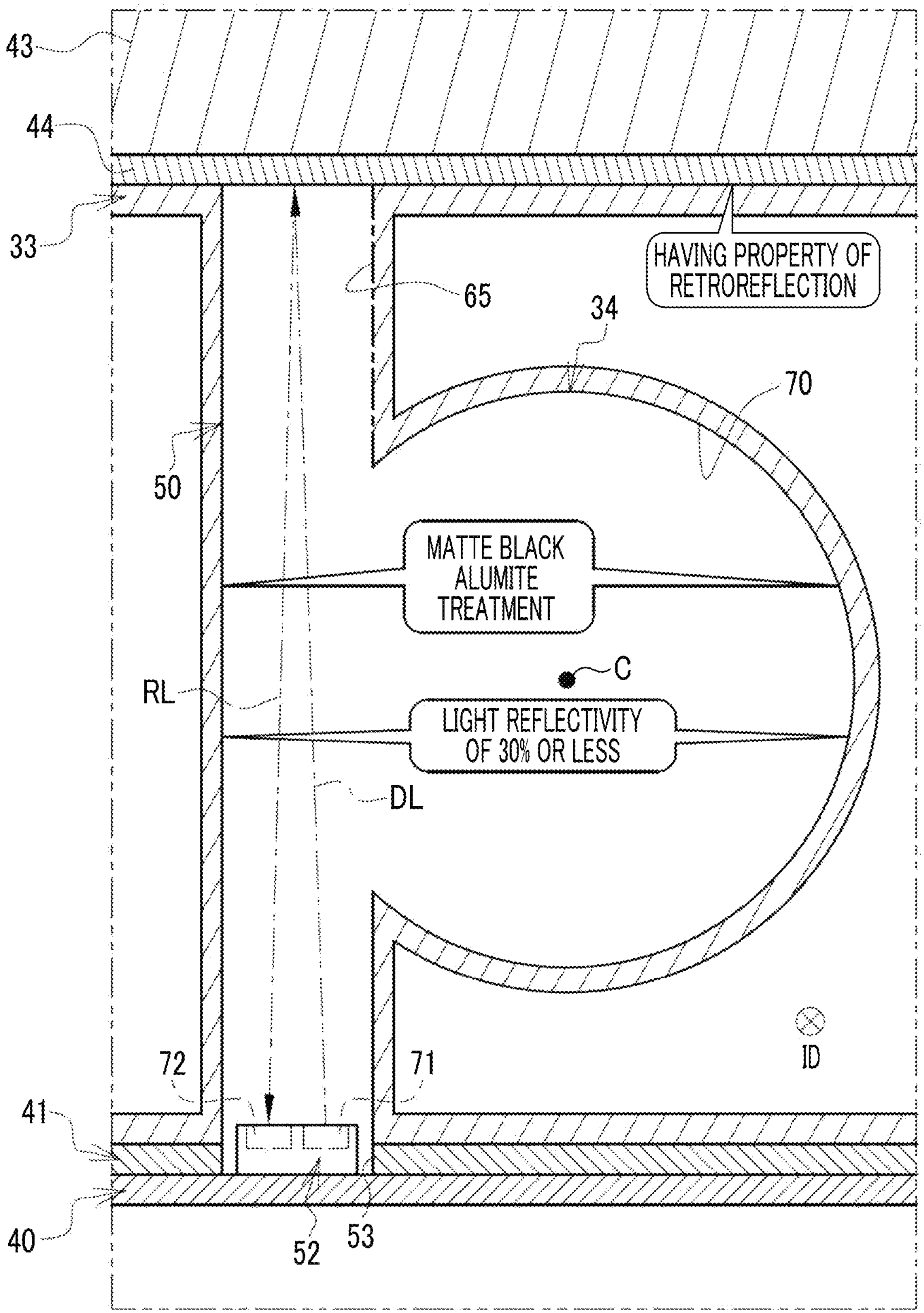
FIG. 10 is an enlarged cross-sectional view of the accommodating hole in which a test tube is not accommodated and the vicinity of the detection optical path.

As shown in FIG. 10 as an example, the wall surface 65 of the detection optical path 50 and the wall surface 70 of the accommodating hole 34 are subjected to a matte black alumite treatment. Therefore, the wall surfaces 65 and 70 are black and have a light reflectivity of 30% or less.

Figure 11:
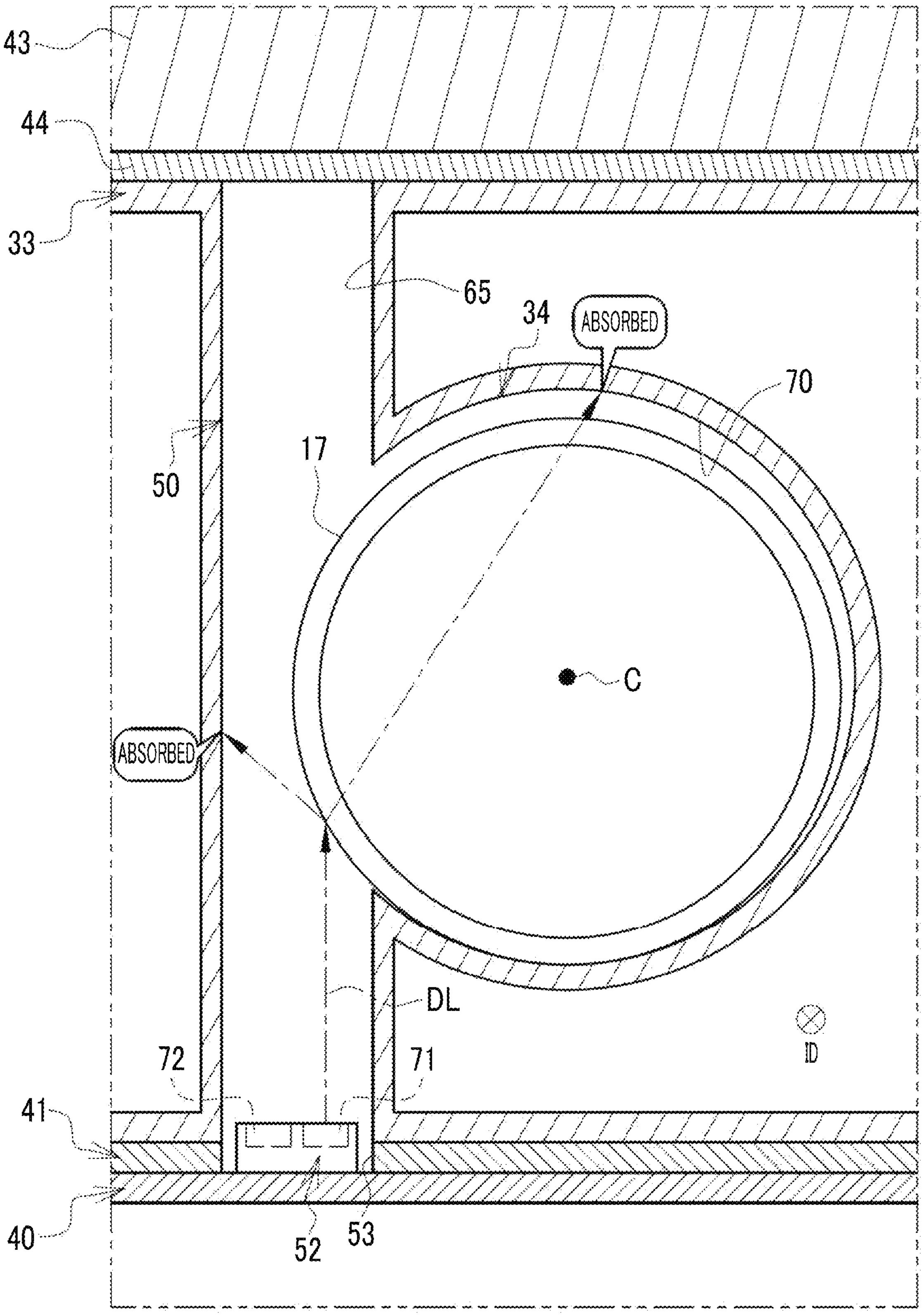
FIG. 11 is an enlarged cross-sectional view of the accommodating hole in which the test tube is accommodated and the vicinity of the detection optical path.

The reflective optical sensor 52 is an optical sensor in which a light projecting unit 71 and a light receiving unit 72 are integrated. The light projecting unit 71 emits the detection light DL every certain time, for example, every four seconds. The detection light DL is, for example, infrared light. As shown in FIG. 10, in a case where the test tube 17 is not accommodated in the accommodating hole 34, the detection light DL propagates through the detection optical path 50 to reach the reflective member 44 provided at the other end, is reflected by the reflective member 44, and is returned as reflected light RL. The light receiving unit 72 receives the reflected light RL. Meanwhile, as shown in FIG. 11, in a case where the test tube 17 is accommodated in the accommodating hole 34, the detection light DL is reflected and refracted by the test tube 17 to change a traveling direction and is mostly absorbed by the wall surface 65 of the detection optical path 50 and the wall surface 70 of the accommodating hole 34. Therefore, the light receiving unit 72 hardly receives the reflected light RL.

Figure 12:
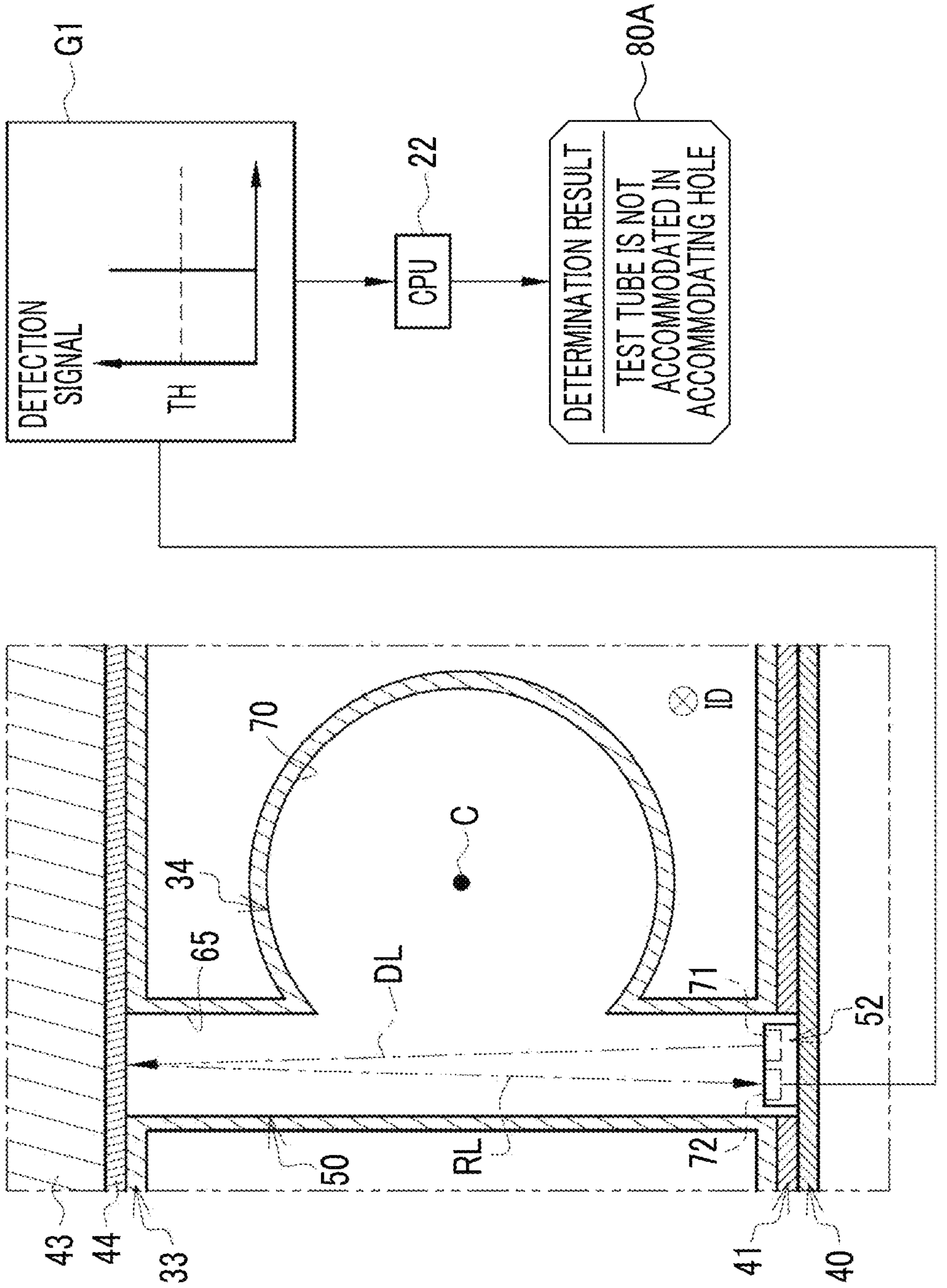
FIG. 12 is a diagram showing a detection signal and a determination result in a case where the test tube is not accommodated in the accommodating hole.

As shown in FIG. 12 as an example, in a case where the test tube 17 is not accommodated in the accommodating hole 34, a detection signal output from the light receiving unit 72 significantly exceeds the set level TH as shown in a graph G1. In this case, the CPU 22 determines that the test tube 17 is not accommodated in the accommodating hole 34, and outputs a determination result 80A indicating that the test tube 17 is not accommodated in the accommodating hole 34.

Figure 13:
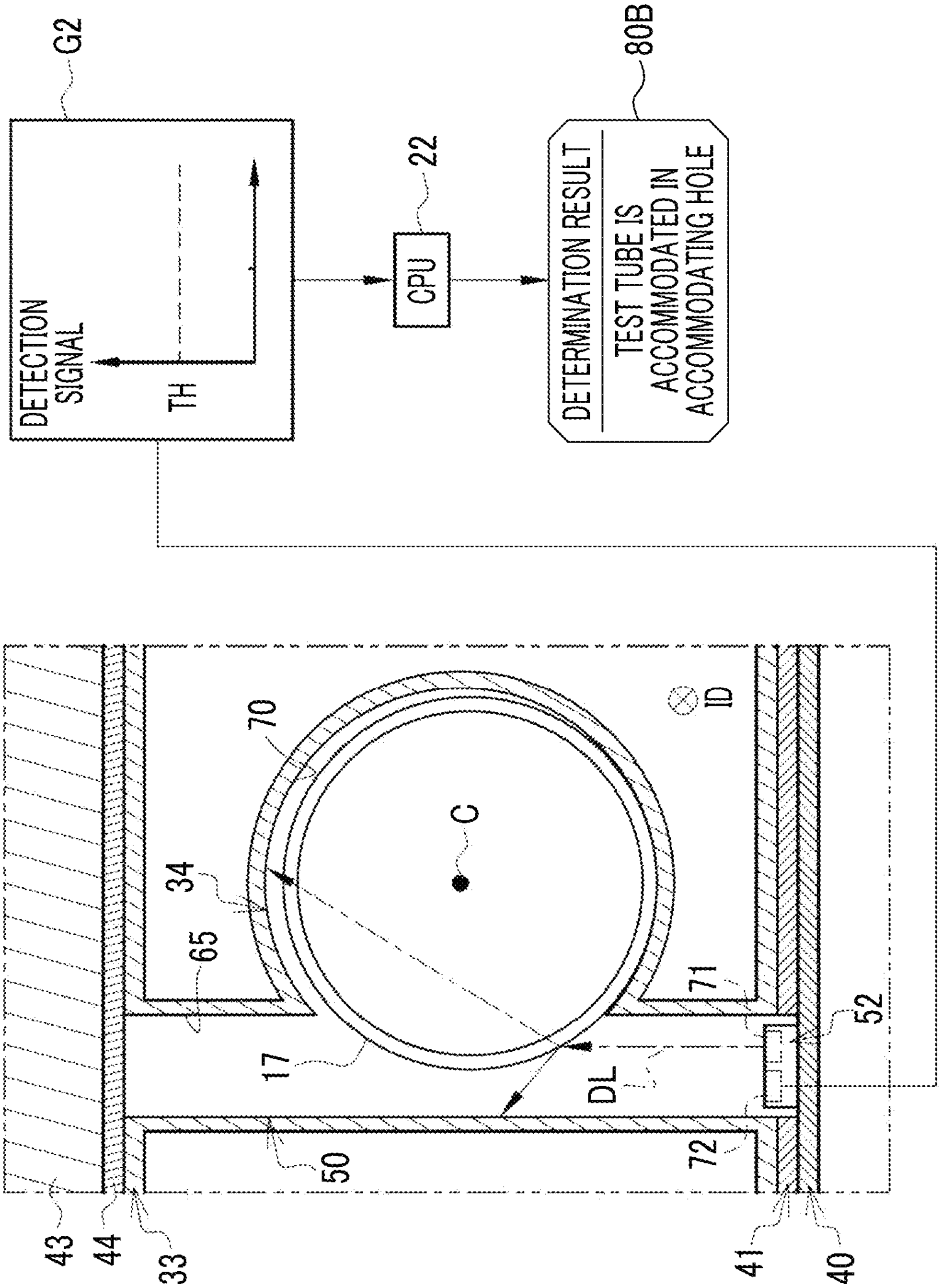
FIG. 13 is a diagram showing a detection signal and a determination result in a case where the test tube is accommodated in the accommodating hole.

On the other hand, as shown in FIG. 13 as an example, in a case where the test tube 17 is accommodated in the accommodating hole 34, the detection signal output from the light receiving unit 72 significantly falls below the set level TH as shown in a graph G2. In this case, the CPU 22 determines that the test tube 17 is accommodated in the accommodating hole 34, and outputs a determination result 80B indicating that the test tube 17 is accommodated in the accommodating hole 34.

The CPU 22 operates the transmissive optical sensor and starts the measurement of the amount of endotoxin in a case where the determination result 80B indicating that the test tube 17 is inserted into and accommodated in the accommodating hole 34 in a state of measurement preparation completion and that the test tube 17 is accommodated in the accommodating hole 34 is output. Simultaneously, the CPU 22 emits green light indicating that the amount of endotoxin is being measured from the state display LED 37.

In addition, the CPU 22 stops the operation of the transmissive optical sensor in a case where the determination result 80A indicating that the test tube 17 is erroneously removed from the accommodating hole 34 during the measurement of the amount of endotoxin and that the test tube 17 is not accommodated in the accommodating hole 34 is output. Simultaneously, the CPU 22 emits red light indicating the measurement error from the state display LED 37.

Further, the CPU 22 emits blue light indicating the measurement preparation completion from the state display LED 37 in a case where the determination result 80A indicating that the measurement of the amount of endotoxin is ended and then the test tube 17 is removed from the accommodating hole 34 and that the test tube 17 is not accommodated in the accommodating hole 34 is output.

As described above, the detection device 60 comprises the holding block 33, the accommodating hole 34, the reflective optical sensor 52, and the detection optical path 50. The holding block 33 holds the cylindrical test tube 17. The accommodating hole 34 is formed in the holding block 33, and the test tube 17 is inserted and accommodated therein. The reflective optical sensor 52 includes the light projecting unit 71 and the light receiving unit 72. The light projecting unit 71 emits the detection light DL for detecting whether or not the test tube 17 is accommodated in the accommodating hole 34. The light receiving unit 72 receives the reflected light RL of the detection light DL. The detection optical path 50 is the optical path of the detection light DL of the tunnel structure covered with the wall surface 65. The detection optical path 50 linearly extends inside the holding block 33 in a direction orthogonal to the accommodating hole 34 and is formed at a position away from the radial center C of the accommodating hole 34. The wall surface 65 of the detection optical path 50 and the wall surface 70 of the accommodating hole 34 have a light reflectivity of 30% or less.

Since the light reflectivity of the wall surface 65 of the detection optical path 50 and the wall surface 70 of the accommodating hole 34 is 30% or less, external light and/or stray light from the detection light DL is mostly absorbed by the wall surfaces 65 and 70. Therefore, the external light and/or the stray light from the detection light DL is less affected, and it is extremely easy to distinguish between the level of the detection signal output from the light receiving unit 72 in a case where the test tube 17 is not accommodated in the accommodating hole 34 and the level of the detection signal output from the light receiving unit 72 in a case where the test tube 17 is accommodated in the accommodating hole 34. Therefore, it is possible to reduce the risk of erroneous determination.

The optical sensor is the reflective optical sensor 52 in which the light projecting unit 71 and the light receiving unit 72 are integrated and disposed at one end of the detection optical path 50. Moreover, the reflective member 44 that reflects the detection light DL, which is emitted from the light projecting unit 71, toward the light receiving unit 72 is disposed at the other end of the detection optical path 50. Therefore, there is no need to adjust the disposition positions of the light projecting unit 71 and the light receiving unit 72, unlike the transmissive optical sensor. Therefore, the reflective optical sensor 52 has a higher degree of freedom in disposition than the transmissive optical sensor. In addition, unlike the transmissive optical sensor, there is no need to adjust the emission power of the detection light DL of the light projecting unit 71 according to the distance. Therefore, achieving high determination accuracy with relatively rough disposition only by disposing the reflective optical sensor 52 at one end of the detection optical path 50 is possible.

The reflective member 44 has the property of retroreflection. Therefore, most of the detection light DL can be received by the light receiving unit 72 as the reflected light RL, and the level of the detection signal output from the light receiving unit 72 in a case where the test tube 17 is not accommodated in the accommodating hole 34 can be further enhanced. As a result, it is easier to distinguish between the level of the detection signal output from the light receiving unit 72 in a case where the test tube 17 is not accommodated in the accommodating hole 34 and the level of the detection signal output from the light receiving unit 72 in a case where the test tube 17 is accommodated in the accommodating hole 34, which makes it possible to further reduce the risk of erroneous determination.

The holding block 33 is made of aluminum. Additionally, the wall surface 65 of the detection optical path 50 and the wall surface 70 of the accommodating hole 34 are subjected to a matte black alumite treatment. Since the matte black alumite treatment is a treatment that is generally widely performed, the wall surfaces 65 and 70 can be easily made black.

The CPU 22 determines that the test tube 17 is not accommodated in the accommodating hole 34 in a case where the detection signal at the set level TH is output from the light receiving unit 72. On the other hand, the CPU 22 determines that the test tube 17 is accommodated in the accommodating hole 34 in a case where the detection signal at the set level TH is not output from the light receiving unit 72.

Figure 14:
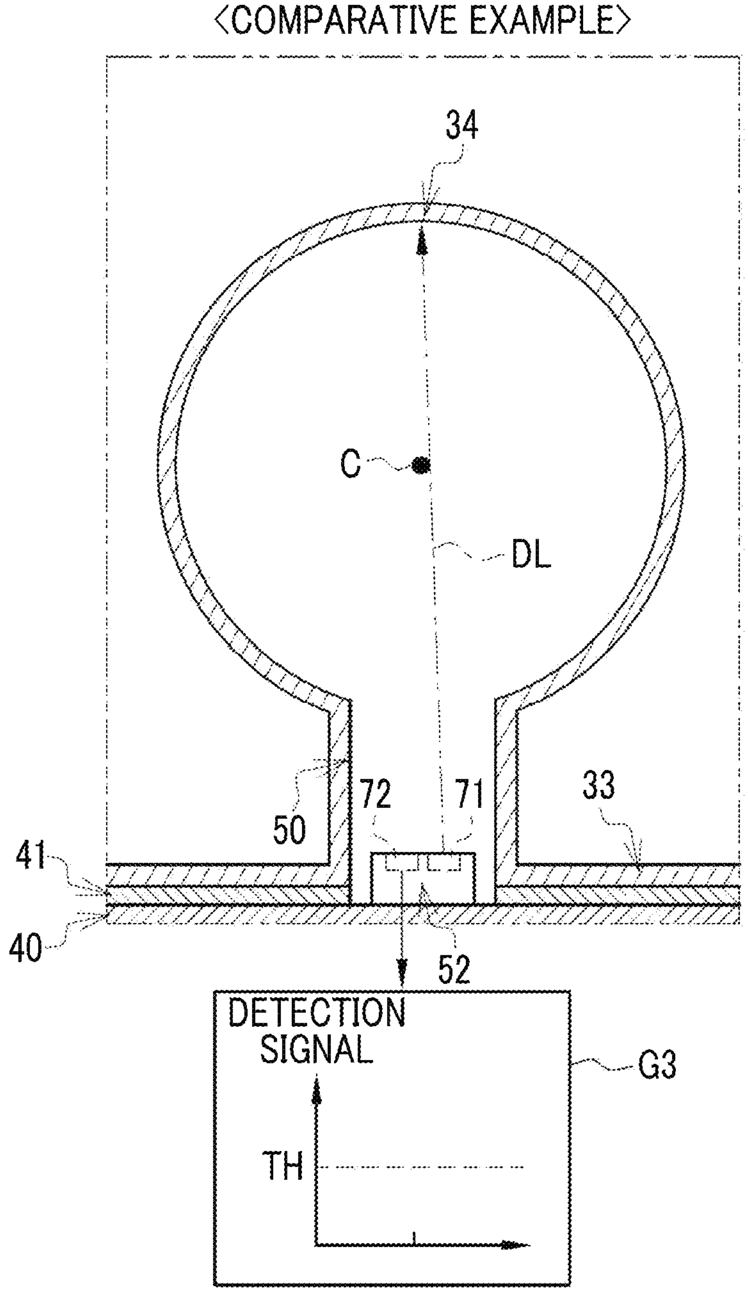
FIG. 14 is a diagram showing a case where a test tube is not accommodated in an accommodating hole in another example of a configuration for determining whether or not the test tube is accommodated in the accommodating hole.
Figure 15:
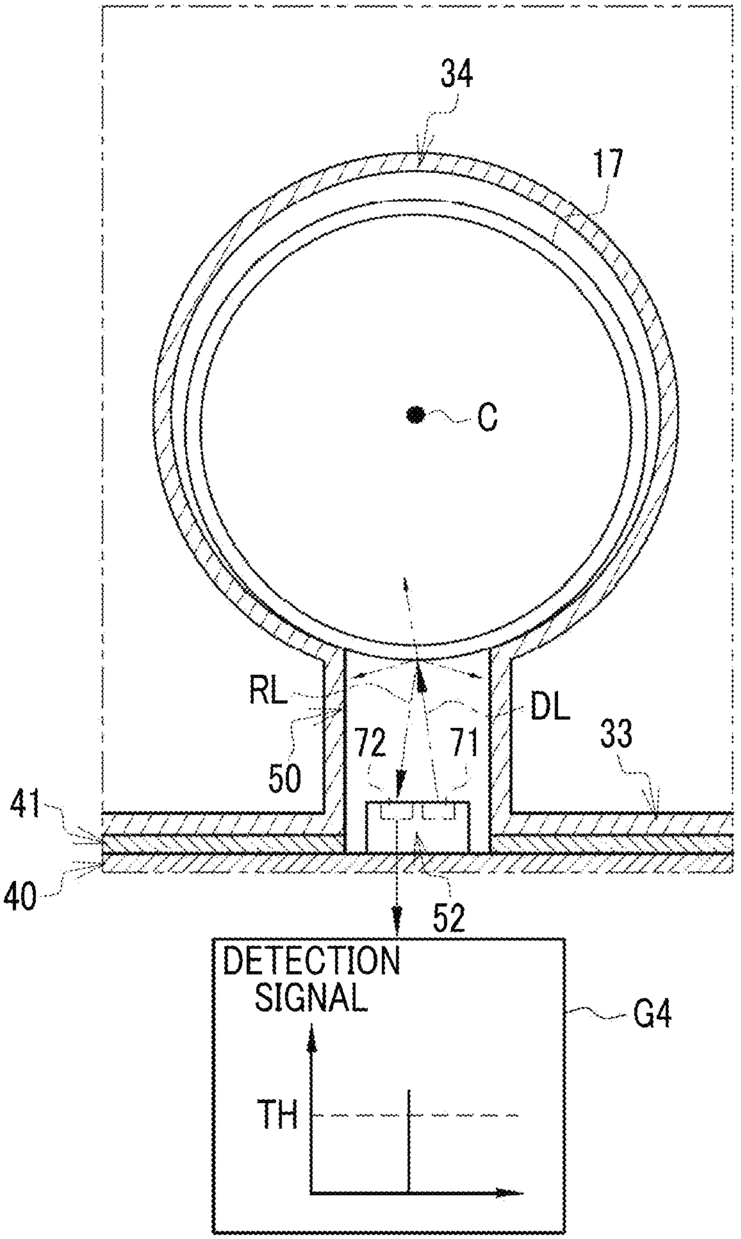
FIG. 15 is a diagram showing a case where the test tube is accommodated in the accommodating hole in the other example of the configuration for determining whether or not the test tube is accommodated in the accommodating hole.

As a configuration for determining whether or not the test tube 17 is accommodated in the accommodating hole 34, the configurations shown in FIG. 14 and FIG. 15 as an example are conceivable. That is, the detection optical path 50 is formed such that a central axis of the detection optical path 50 passes through the radial center C of the accommodating hole 34. Then, contrary to the technology of the present disclosure, it is determined that the test tube 17 is not accommodated in the accommodating hole 34 in a case where the detection signal at the set level TH is not output from the light receiving unit 72 as shown in FIG. 14. On the other hand, as shown in FIG. 15, it is determined that the test tube 17 is accommodated in the accommodating hole 34 in a case where the detection signal at the set level TH is output from the light receiving unit 72.

In this aspect, the detection signal output from the light receiving unit 72 in a case where the test tube 17 is not accommodated in the accommodating hole 34 significantly falls below the set level TH as shown in a graph G3 of FIG. 14. On the other hand, the detection signal output from the light receiving unit 72 in a case where the test tube 17 is accommodated in the accommodating hole 34 exceeds the set level TH as shown in a graph G4 of FIG. 15, but it does not significantly exceed the set level TH, unlike the graph G1 shown in FIG. 12. The cause of this is that, since the test tube 17 has a cylindrical shape, it is considered that the detection light DL is reflected in all directions on the surface of the test tube 17 and the amount of the reflected light RL returning to the light receiving unit 72 is reduced. In addition, since the test tube 17 is transparent, it is also considered that the detection light DL is transmitted through the test tube 17 and the reflected light RL returning to the light receiving unit 72 is reduced. Therefore, in some cases, the detection signal falls below the set level TH even though the test tube 17 is accommodated in the accommodating hole 34, and there is a risk of the CPU 22 making erroneous determination that the test tube 17 is not accommodated in the accommodating hole 34.

However, in the technology of the present disclosure, the detection optical path 50 is formed at a position away from the radial center C of the accommodating hole 34 as described above. It is determined that the test tube 17 is not accommodated in the accommodating hole 34 in a case where the detection signal at the set level TH is output from the light receiving unit 72, and it is determined that the test tube 17 is accommodated in the accommodating hole 34 in a case where the detection signal at the set level TH is not output from the light receiving unit 72. Therefore, it is possible to reduce the risk of erroneous determination as compared with the aspects shown in FIGS. 14 and 15.

The measurement apparatus 10 is equipped with the detection device 60, the tubular body is the cylindrical test tube 17 in which the sample solution SS formed by mixing the lysate reagent with the sample is stored, and the amount of endotoxin in the sample is measured. The measurement apparatus 10 starts the measurement of the amount of endotoxin or detects a measurement error by determining whether or not the test tube 17 is accommodated in the accommodating hole 34. Therefore, it is possible to further exhibit the effect that the risk of erroneous determination can be reduced. Specifically, it is possible to significantly reduce the probability of occurrence of defects such as delayed measurement of the amount of endotoxin due to erroneous determination when the test tube 17 is accommodated in the accommodating hole 34, or the failure to detect measurement errors due to erroneous determination when the test tube 17 has been removed from the accommodating hole 34.

The rubber heater 45 for warming the sample solution SS inside the test tube 17 to a set temperature is attached to the holding block 33. Therefore, the amount of endotoxin can be measured at the set temperature.

The optical sensor is not limited to the reflective optical sensor 52 and may be a transmissive optical sensor. In addition, the detection optical path 50 need only linearly extend inside the holding block 33 in a direction intersecting with the accommodating hole 34 and need not extend in the exemplified orthogonal direction. Further, the reflective member 44 need not have the property of retroreflection.

The holding block 33 need not be made of aluminum and may be made of, for example, copper. In addition, a treatment of making the wall surface 65 of the detection optical path 50 and the wall surface 70 of the accommodating hole 34 black need not be the matte black alumite treatment and may be, for example, a matte black plating treatment. Further, the wall surface 65 of the detection optical path 50 and the wall surface 70 of the accommodating hole 34 need only have a light reflectivity of 30% or less and are not limited to being black. For example, dark navy color may be used.

In a case where the light reflectivity of the wall surface 65 of the detection optical path 50 and the wall surface 70 of the accommodating hole 34 is 30% or less, the influence of the external light and/or the stray light from the detection light DL can be sufficiently eliminated. However, in order to more reliably eliminate the influence of the external light and/or the stray light from the detection light DL, it is more preferable that the light reflectivity of the wall surface 65 of the detection optical path 50 and the wall surface 70 of the accommodating hole 34 is 10% or less.

The specific substance is not limited to the exemplified endotoxin. Instead of endotoxin, β-glucan, which has been reported to enhance the action of endotoxin, may be used. In addition, instead of or in addition to the measurement of the amount of a specific substance in the sample, such as endotoxin, the presence or absence of the specific substance in the sample may be measured. Further, a method of measuring the amount of the specific substance in the sample based on absorbance of visible light by using a lysate reagent containing a chromogenic substrate may be used.

The test tube 17 is not limited to the cylindrical shape and may have an elliptical cylindrical shape. Further, the tubular body is not limited to the test tube 17 and may be, for example, cell culture dishes, chemical experiment flasks, drinking cups, and the like. Therefore, an apparatus equipped with the detection device 60 is not limited to the exemplified measurement apparatus 10. For example, in a case where the tubular body is a cell culture dish, the detection device 60 may be installed in an incubator into which the dish is introduced.

In each of the above-described embodiments, as a hardware structure of a processing unit that executes various types of processing, various processors to be described below can be used. The various processors include, for example, in addition to the CPU 22 which is a general-purpose processor that executes software (operation program 25) to function as various processing units, a programmable logic device (PLD) which is a processor whose circuit configuration can be changed after manufacturing, such as a field programmable gate array (FPGA), and/or a dedicated electrical circuit which is a processor having a dedicated circuit configuration designed to execute specific processing, such as an application specific integrated circuit (ASIC).

One processing unit may be composed of one of these various processors or may be composed of a combination of two or more processors of the same type or different types (for example, a combination of a plurality of FPGAs and/or a combination of a CPU and an FPGA). Alternatively, a plurality of processing units may be composed of one processor.

A first example in which a plurality of processing units are composed of one processor is an aspect in which one or more CPUs and software are combined to configure one processor and the processor functions as a plurality of processing units, as represented by a computer such as a client and a server. A second example is an aspect in which a processor that realizes functions of the entire system including a plurality of processing units with one integrated circuit (IC) chip is used, as represented by system on chip (SoC) and the like. As described above, various processing units are composed of one or more of the above various processors as the hardware structure.

Further, as the hardware structure of the various processors, more specifically, an electrical circuit (circuitry) in which circuit elements such as semiconductor elements are combined can be used.

The technology of the present disclosure can also be implemented by appropriately combining the above-described various embodiments and/or various modification examples. Further, the technology of the present disclosure is not limited to the above-described embodiments and various configurations can also be employed without departing from the gist thereof, of course. Furthermore, the technology of the present disclosure extends not only to a program but also to a storage medium that stores the program in a non-transitory manner.

The contents described and shown above are detailed descriptions of portions related to the technology of the present disclosure and are merely an example of the technology of the present disclosure. For example, the descriptions of the above-described configurations, functions, operations, and effects are the descriptions of an example of the configurations, functions, operations, and effects of the portions related to the technology of the present disclosure. Accordingly, it goes without saying that unnecessary portions may be deleted, new elements may be added, or replacement may be made in the contents described and shown above without departing from the gist of the technology of the present disclosure. Further, in order to avoid complications and facilitate understanding of the portions related to the technology of the present disclosure, descriptions of common general knowledge and the like that do not require special descriptions for enabling the implementation of the technology of the present disclosure are omitted, in the contents described and shown above.

In the present specification, "A and/or B" is synonymous with "at least one of A or B". That is, "A and/or B" means that only A may be used, only B may be used, or a combination of A and B may be used. Additionally, in the present specification, the same concept as "A and/or B" is also applied to a case where three or more matters are expressed by "and/or".

All documents, patent applications, and technical standards described in the present specification are incorporated in the present specification by reference to the same extent as in a case in which the individual documents, patent applications, and technical standards were specifically and individually stated to be incorporated by reference.

What is claimed is:

1. A detection device comprising:

a holding block configured to hold a transparent tubular body having a curved surface shape;

an accommodating hole that is formed in the holding block and in which the tubular body is inserted and accommodated;

an optical sensor comprising a light projecting unit configured to emit detection light for detecting whether or not the tubular body is accommodated in the accommodating hole and a light receiving unit which receives the detection light; and an optical path of the detection light comprising a tunnel structure covered with a wall surface, the optical path linearly extending inside the holding block in a direction intersecting with the accommodating hole and being formed at a position away from a radial center of the accommodating hole, wherein a wall surface of the accommodating hole and a wall surface of the optical path have are configured to have a light reflectivity of 30% or less due to being subjected to a matte black alumite treatment.

2. The detection device according to claim 1, wherein the optical sensor is a reflective optical sensor in which the light projecting unit and the light receiving unit are integrated and disposed at one end of the optical path, and a reflective member that reflects the detection light, which is emitted from the light projecting unit, toward the light receiving unit is disposed at the other end of the optical path.

3. The detection device according to claim 2, wherein the reflective member has a property of retroreflection.

4. The detection device according to claim 1, wherein the holding block is made of aluminum.

5. The detection device according to claim 1, further comprising:

a processor; and a memory connected to or incorporated into the processor, wherein the processor is configured to:

determine that the tubular body is not accommodated in the accommodating hole in a case where a detection signal at a set level is output from the light receiving unit; and determine that the tubular body is accommodated in the accommodating hole in a case where the detection signal at the set level is not output from the light receiving unit.

6. A measurement apparatus comprising:

the detection device according to claim 1 installed thereon, wherein the tubular body is a cylindrical test tube in which a sample solution formed by mixing a lysate reagent with a sample is stored, and presence or absence and/or an amount of a specific substance in the sample is measured.

7. The measurement apparatus according to claim 6, wherein a heater for warming the sample solution inside the test tube to a set temperature is attached to the holding block.

* * * * *